April 6, 1954
J. T. DESSUREAU ET AL  
ABRASIVE CUTTING WIRE STONE SAW  
WITH AUTOMATIC DOWN FEED
2,674,238
Filed Feb. 10, 1953
3 Sheets-Sheet 1
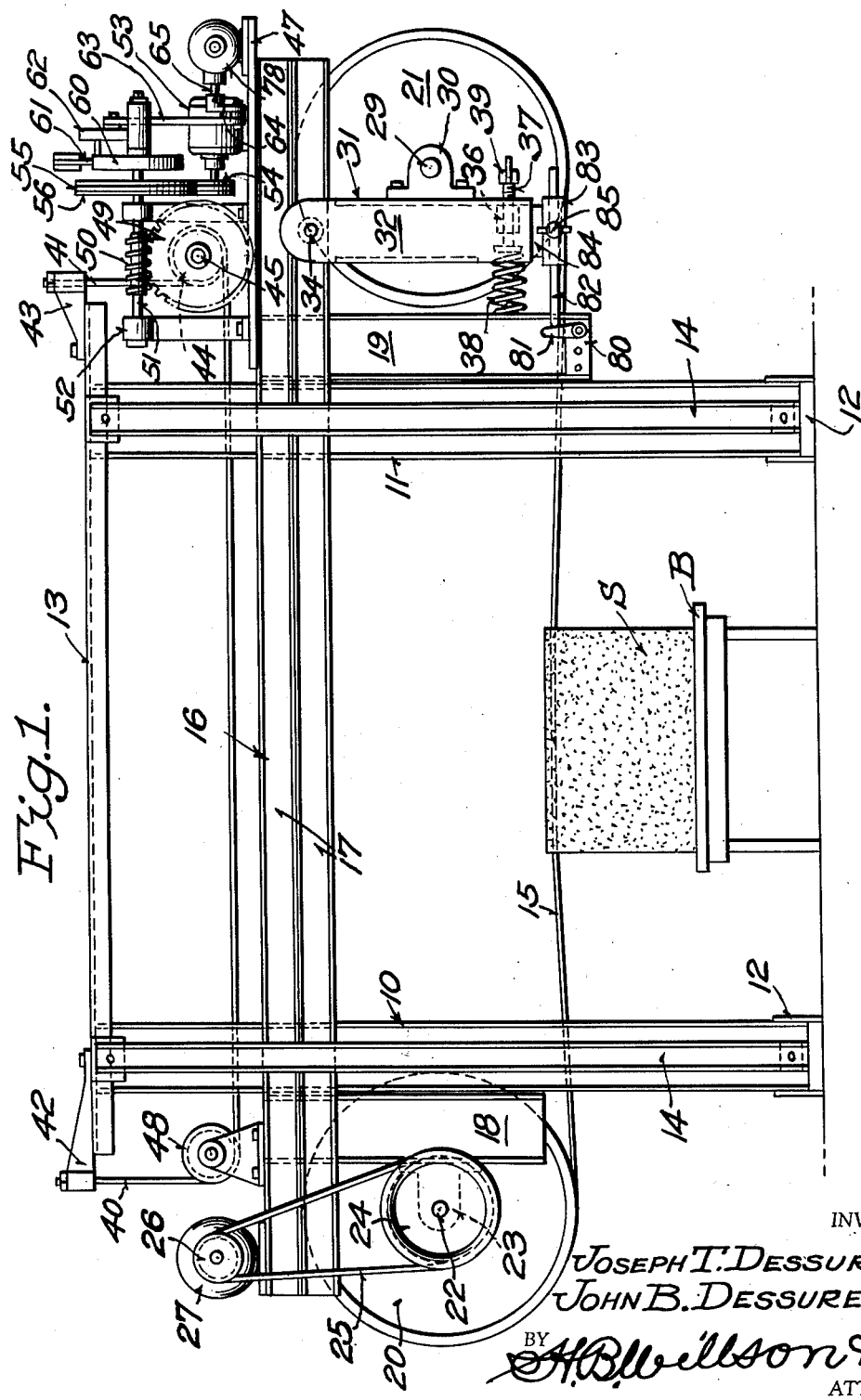
INVENTORS  
JOSEPH T. DESSUREAU,  
JOHN B. DESSUREAU,  
BY H.B.Willson&Co.  
ATTORNEY

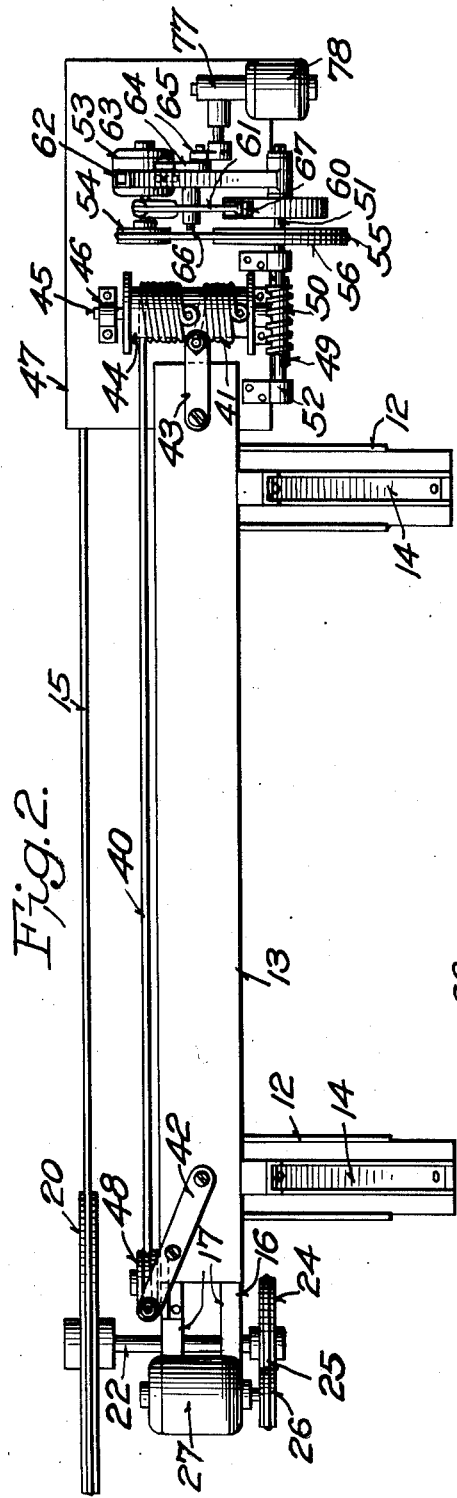

April 6, 1954
J. T. DESSUREAU ET AL
2,674,238
ABRASIVE CUTTING WIRE STONE SAW
WITH AUTOMATIC DOWN FEED
Filed Feb. 10, 1953
3 Sheets-Sheet 3
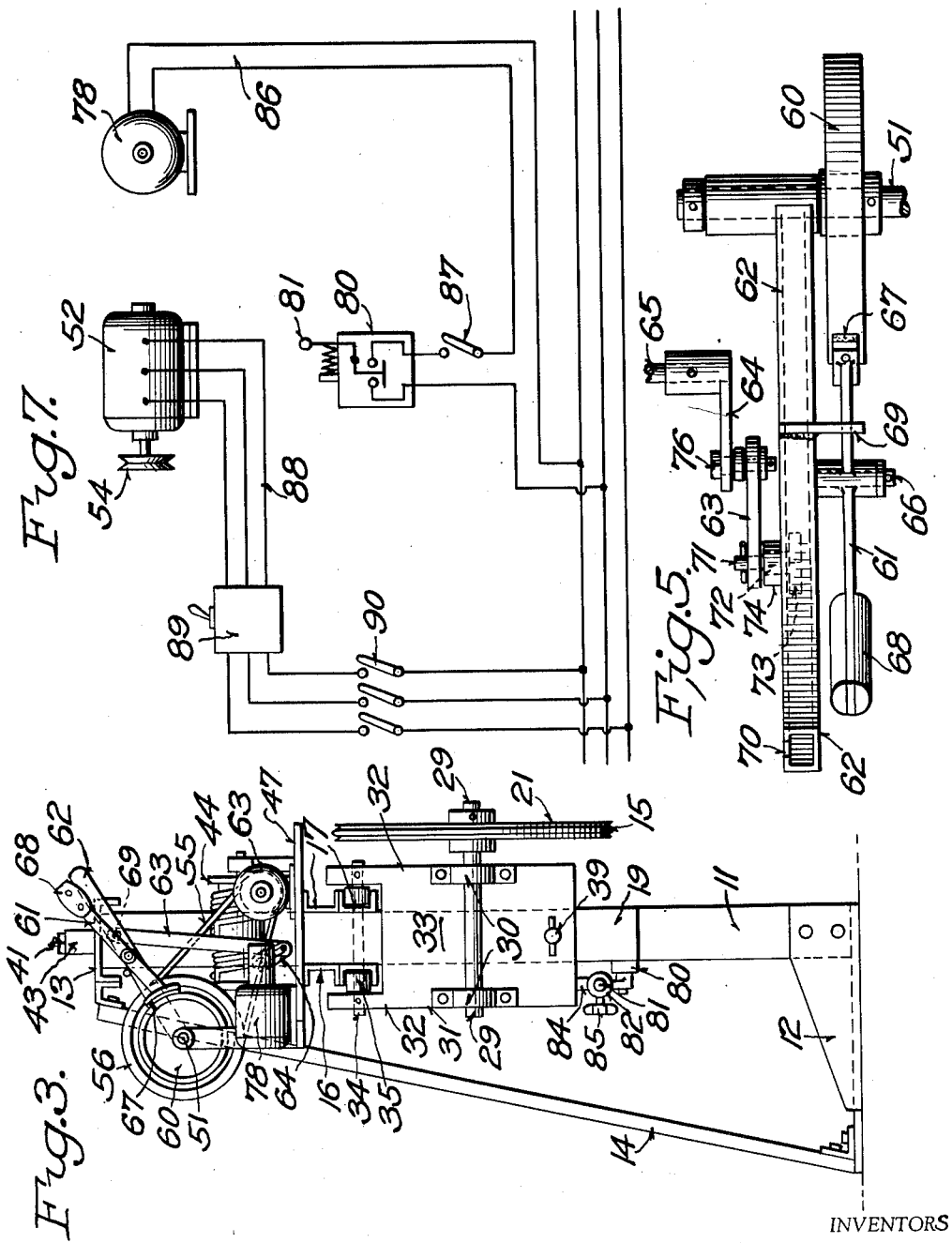
INVENTORS
Joseph T. Dessureau,
John B. Dessureau,
BY H. B. Wellson & Co.
ATTORNEY Patented Apr. 6, 1954

2,674,238

UNITED STATES PATENT OFFICE 2,674,238

ABRASIVE CUTTING WIRE STONE SAW WITH AUTOMATIC DOWN FEED

Joseph T. Dessureau and John B. Dessureau, Barre, Vt.

Application February 10, 1953, Serial No. 336,114

10 Claims. (Cl. 125—21)

This invention relates to machines for cutting or sawing blocks of granite, marble and other stone by means of one or more endless abrasive cutting wires or cables.

The principal object of the invention is to provide an improved machine of this character in which the carriage for the cutting wire or saw will be automatically fed down to the work, regardless of its size, a little faster than the cutting wire can remove the material in the cut.

Another object of the invention is to provide an improved machine of this character in which the down feed for the cutting wire will be automatically controlled by the longitudinal flexing of the cutting run or stretch of the wire on the stone being cut.

Another object is to provide an automatic down feed for the endless cutting wire in which one of the wheels about which the wire passes is carried by a movably mounted member, the latter being moved in one direction by an adjustable spring means to put the wire under tension and being moved in the opposite direction by the pressure of the wire on the stone bowing or longitudinally flexing the lower cutting stretch of the wire, the back and forth movement of such member causing the saw carriage to be automatically lowered step by step as the cutting operation proceeds and until the cut has been completed.

Another object is to provide an automatic down feed of the above indicated character in which the movable member that permits the cutting wire to bow or flex, causes the actuation of a limit switch in the circuit of an electric motor the operation of which controls the cable suspending means of the saw carriage.

Another object is to provide an automatic down feed for the cutting wire in which a swinging or pendulum-like member depends from the carriage and supports one end of the endless cutter, and also carries at its lower end adjustable means for operating the limit switch.

Another object is to provide such an automatic down feed for the saw carriage in which a reversible electric motor may be used to actuate the cable and drum suspending means to quickly raise the carriage or lower it to position the cutting wire in contact with the stone and in which another electric motor controlled by the limit switch may be used to actuate mechanism which also actuates that cable and drum suspending means slowly and at intervals to lower the saw automatically with the cut of the stone.

With the above and other objects and advantages in view, the invention resides in the novel combinations and arrangements of parts and the novel features of construction hereinafter described and claimed, and illustrated in the accompany drawings which show the present preferred embodiment of the invention.

In the drawings:

Fig. 1 is a rear side view of the improved stone sawing machine;

Fig. 2 is a top plan view;

Fig. 3 is an end view;

Fig. 4 is a detail side view, on an enlarged scale, of parts of the step by step friction drive used in lowering the cutter as the stone is cut;

Fig. 5 is a detail front view of the parts shown in Fig. 4;

Fig. 6 is a top plan view of the same parts; and

Fig. 7 is a circuit diagram.

Referring more in detail to the drawings the main frame of the machine may comprise two horizontally spaced uprights 10 and 11 rising from the corresponding ends of two feet or base members 12 and having their upper ends connected by a horizontal top member 13. These parts, including inclined braces 14 extending from the other ends of the feet 12 to the top member may be made of structural steel. The posts or uprights are H-beams and the top bar 13 is an inverted channel beam. The feet 12 are bolted to a concrete base (not shown), and the latter may have a pit over which the block of stone to be cut is supported, since the usual abrasive circulating system, such as used with machines of this character, will be employed. As shown in Fig. 1, the block of stone S is on a conventional support B between the posts.

The endless saw or cutting element 15 is mounted on a carriage 16 vertically slidable on the posts or uprights 10 and 11. The body of the carriage straddles the posts and its ends project beyond the latter as seen in Fig. 1. It comprises two pairs of superimposed and suitably connected U-beams 17 with their flanges turned outwardly and their web portions in slidable engagement with the flanges of the two posts. The carriage also includes two vertical H-beams 18 and 19 welded at their upper ends between the pairs of beams 17, the inner flanges of these depending legs or beams being in slidable contact with the outermost flanges of the posts. The carriage body is thus a rigid unitary structure which will be guided for vertical movement on the stationary frame.

The cutter 15 is preferably a ¼" diameter two strand twist abrasive cutting wire or cable of well known form, such as shown in the Burkhardt Patent No. 1,662,488, March 13, 1928. By the expression endless cutting wire as used herein is meant any suitably flexible, endless, abrading or cutting element. The wire passes around a drive pulley or wheel 20 at one end of the machine and a similar tensioning pulley or wheel 21 at the other end. The wheel 20 is fixed to the front end of a transverse shaft 22 journalled in a bearing 23 on the depending end bar 18. To the rear end of the shaft is fixed a pulley 24 connected by a belt 25 to a driving pulley 26 on the shaft of an electric motor 27 mounted on top of the adjacent projecting ends of the beams 17. The circuit and control switch of this saw driving motor are not shown.

The wheel 21 is fixed to the front end of a transverse shaft 29 journalled in bearings 30 on a member 31 mounted for movement toward and from the axis of the wheel 20 so that movement of the wheel 21 away from the wheel 20 will put the endless cutting wire 15 under tension and movement in the opposite direction will permit the lower run or stretch of the wire to bow or flex longitudinally when it is lowered and contacts with the top of the block S. While the member 31 may be mounted for sliding movement, it is preferably swingable in a direction lengthwise of the machine and is shown as in the nature of a pendulum pivoted at its upper end to the adjacent projecting end of the beams 17 and normally disposed substantially parallel with but spaced from the depending leg or beam 19 of the saw carriage. This pendulum-like member 31 is shown as made of front and rear plates 32 spaced apart by connecting plates 33 so that the projecting upper ends of the plates 32 are disposed opposite the lower channel beams 17 and are fixed to a pivot shaft 34 extending through and mounted in suitable bearings 35 on the last mentioned channels 17. The bearings 30 are mounted on one side of this hollow swinging member 31, and fixed within it adjacent its lower end is a nut member 36 for an adjusting screw 37 for a spring 38 which tends to swing the member 31 in a direction to permit the cutting wire under tension. The spring 38 is preferably a coil spring interposed between the members 19 and 31 and having one end anchored to the depending beam 19 and its other end thrusting against the screw 36. The latter extends through an opening in the outer plate 33 and carries a finger piece 39. This screw is adjusted to put the cutting wire under the desired tension. It will be seen that when the carriage 16 is lowered and the lower stretch of the wire 15 contacts the stone S it will bow upwardly and swing the member or hanger 31 on its axis 34 to further compress the spring 38, and that as the wire cuts into the stone the spring will tend to move the member 31 in the opposite direction to straighten the lower stretch of the wire. This back and forth or oscillating movement of the member or hanger 31 is used to control the downward feed of the saw to the work as hereinafter described.

The saw carriage 16 is suspended by two cables, chains or the like 40 and 41 which have their upper ends anchored to brackets 42 and 43 respectively on the ends of the top beam 13. The opposite ends of the cables are wound in the same direction on a drum 44 fixed to a transverse shaft 45 journalled in bearings 46 on a horizontal supporting plate 47 fixed on the top of the projecting ends of the carriage beams 17. The winding drum is disposed substantially beneath the bracket 43, as seen in Fig. 1. The cable 40 passes around a guide pulley 48 on a bracket secured to the carriage substantially beneath the bracket 42. Fixed to the rear end of the shaft 45 is a worm gear 49 which meshes with a worm 50 on a longitudinally extending shaft 51 journalled in bearings 52 on the rear portion of the plate 47. This worm gearing is driven to quickly raise or lower the carriage 16 by a reversible electric motor 53 also mounted on the plate 47. The shaft of this motor has a pulley 54 connected by a belt 55 to a pulley 56 fixed to the projecting portion of the worm shaft 51. It will be seen that when the armature of the motor turns in one direction the cables will be wound on the drum to raise the carriage and when its direction is reversed the cables will be unwound to lower the carriage.

The worm gearing, and drum and cable means are also used to slowly lower the carriage in a step-by-step or intermittent manner to lower the cutting wire automatically with the cut of the stone. This automatic feed comprises a friction wheel 60 fixed to the worm shaft 51 and moved by a pivoted feed dog or lever 61. The latter is pivoted between its ends on an oscillatory down-feed lever 62 swingable about the shaft 51 and actuated by a link 63 connected between it and a crank arm 64 on an intermittently rotated shaft 65. These parts constitute an intermittent grip mechanism for imparting a step-by-step rotation to the worm shaft 49 in the direction to cause the carriage to be slowly lowered. The lever 62 has at one end a hub rotatable on the shaft 51, and between its ends it carries a laterally projecting stud or pivot 66 about which the feed dog 61 swings. As shown in Fig. 4 both the lever and the dog are disposed angularly with respect to a vertical plane passing through the axis of the shaft 51, the angle of the dog being such that a friction shoe 67 on the lower end of the dog will grip the periphery of the wheel 60 and rotate it when the lever 62 swings downwardly. The shoe 67 is faced with leather or other friction material. The upper end of the dog is provided with a suitable weight 68 to hold the shoe against the wheel when the parts are in the full line position in Fig. 4. When the motor 53 is used to quickly raise or lower the carriage, the dog 61 is tripped or swung to the inoperative position shown in dotted lines in Fig. 4. When that is done the weight holds the dog against a stop pin 69 on the lever and the shoe away from the friction wheel. The link 63 is adjustably pivoted to the lever 62 to vary the rate of downward feed of the carriage and its cutting wire. That may be done by making the outer portion of the lever in the form of a rectangular tube with a longitudinal slot 70 in one side. As shown in Fig. 5 the pivot 71 for the upper end of the link is formed by the reduced end of a screw threaded shank 72 movable in slot 70 and having a head or block 73 slidable in the hollow portion of the lever. A nut 74 on the shank clamps the pivot in an adjusted position. A further adjustment may be provided by forming the crank arm 64 with a longitudinal slot 75 for an adjustable bolt 76 which serves as a pivot for the lower end of the link.

The shaft 65 is connected through a suitable speed reduction gear 77 to the armature shaft of an electric motor 78 mounted on the rear portion of the supporting plate or base 47. This down-feed motor is started and stopped by a well known form of limit switch 80 made by the General Electric Company. This switch includes a lever 81 projecting from its casing and actuated in one direction by an expansion spring. The switch as shown in Fig. 1 is mounted on the depending leg 19 of the carriage so that its lever is disposed in the path of movement of an adjustable actuating element 82 carried by the pendulum or swinging hanger 31 for the bearing of the shaft of the tensioning wheel 21. As shown the member or element 82 is in the form of a straight rod slidable in a tubular portion 83 of a bracket 84 secured to the lower end of the hanger 31. A clamping screw 85 is threaded into the portion 83 to hold the rod 82 in an adjusted position.

As shown in Fig. 7, the circuit 86 of the motor 78 and the limit switch 80 also includes a cut-off switch 87; and the circuit 88 of the motor 53 includes a reversing switch 89 and a cut-off switch 90.

The operation of the machine will probably be apparent from the foregoing detail description of the illustrated embodiment of the invention. With the down-feed dog tripped to its inoperative position, the carriage 16 is moved to an elevated position by manipulating the switches 89 and 90 to cause the motor 53 to wind the cables on the drum. The stone is properly positioned beneath the cutting wire, and after the screw 39 is adjusted to put the wire under the desired tension, those switches are again manipulated to lower the carriage so that the wire contacts with the top of the stone and its lower cutting stretch is bowed as seen in Fig. 1. The down-feed dog 61 is then moved to its operative position. With the switch 87 closed, and the rod 82 properly adjusted, the bowing of the wire will swing the hanger member 31 to further compress its spring 38 and cause the rod to move the lever 81 of the limit switch to open position. As the saw cuts into the stone, the spring swings the hanger 31 in the opposite direction and moves the rod 82 to permit the limit switch to close the circuit of the motor 78. The latter then causes the intermittent grip device to slowly unwind the cables from the drum, and thus lower the cutting wire to increase its downward pressure against the stone. It will thus be seen that when pressure is applied to the cutting wire to the extent that it draws the pendulum or hanger 31 toward the main frame, it also moves the rod 82 which operates the limit switch and cuts out the down-feed motor 78, and that as the wire cuts into the stone the hanger 31 swings away from the frame and the limit switch cuts in the motor and starts the down-feed of the carriage. Such operation is repeated until the sawing is finished.

It is to be noted that the flexing or bowing of the cutting stretch of the wire against the stone, regardless of the size of the latter, automatically controls the down-feed of the wire, and that the carriage will feed down only as fast as the wire can remove the material from the cut in the stone.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

What is claimed is:

1. In a machine of the character set forth, the combination of an upright frame, an elongated carriage vertically movable thereon, a power-driven, endless cutting wire, means mounting said wire on said carriage, said means including horizontally spaced wheels which dispose the lower stretch of said wire substantially horizontally for cutting engagement with the work-piece, means for suspending said carriage on said frame and lowering it to force the cutting stretch of the wire against the work-piece, said means for suspending and lowering the carriage including a cable and drum mechanism and worm gearing actuating the latter, said mounting means also including a movable member on which one of said wheels is mounted, said member being movable to move its wheel toward and from the other wheel, means normally urging said member in the direction to put said wire under predetermined tension, said member being moved in the opposite direction to increase the tension by the cutting stretch of the wire being flexed upwardly by being forced against the work-piece by the down-movement of the carriage, and means controlled by the alternate movement of said member in opposite directions for alternately starting and stopping said carriage lowering means to automatically lower the cutting stretch of the wire as fast as it removes the material in the cut in the work-piece, said means controlled by the alternate movement of said member in opposite directions comprising an intermittent grip mechanism for the step-by-step actuation of said worm gearing, an electric motor for actuating said intermittent grip mechanism, and a switch in the circuit of said motor, said switch being opened and closed by the movement of said member in opposite directions.

2. In a machine of the character set forth, the combination of an upright frame, an elongated carriage vertically movable thereon, a power-driven, endless cutting wire, means mounting said wire on said carriage, said means including horizontally spaced wheels which dispose the lower stretch of the wire substantially horizontally for cutting engagement with the work-piece, means for suspending said carriage on said frame and lowering it to force the cutting stretch of the wire against the work-piece, said mounting means also including a movable member on which one of said wheels is mounted, said member being movable to move its wheel toward and from the other wheel, means normally urging said member in the direction to put said wire under predetermined tension, said member being moved in the opposite direction to increase the tension by the cutting stretch of the wire being flexed upwardly by being forced against the work-piece by the down-movement of the carriage, and means controlled by the alternate movement of said member in opposite directions for alternately starting and stopping said carriage lowering means to automatically lower the cutting stretch of the wire as fast as it removes the material in the cut in the work-piece, said means for suspending and lowering the carriage including a cable and drum mechanism and worm gearing actuating the latter, the worm of said worm gearing having a shaft, and in which said means controlled by the alternate movement of said member in opposite directions comprises an intermittent grip mechanism for the step-by-step actuation in one direction of the shaft of said worm, an electric motor for actuating said intermittent grip mechanism, and a switch in the circuit of said motor, said switch being opened and closed by the movement of said member in opposite directions, said intermittent grip mechanism including a driving dog which may be tripped to render the last mentioned mechanism inoperative, together with a reversible electric motor on said carriage, and a belt and pulley drive between said shaft and said reversible motor.

3. In a machine of the character set forth, the combination of an upright frame, an elongated carriage vertically movable thereon, a power-driven, endless cutting wire, means mounting said wire on said carriage, said means including horizontally spaced wheels which dispose the lower stretch of said wire substantially horizontally for cutting engagement with the work-piece, means for suspending said carriage on said frame and lowering it to force the cutting stretch of the wire against the work-piece, said mounting means including a movable member on which one of said wheels is mounted, said member being movable to move its wheel toward and from the other wheel, means normally urging said member in the direction to put said wire under predetermined tension, said member being moved in the opposite direction to increase the tension by the cutting stretch of the wire being flexed upwardly by being forced against the work-piece by the down-movement of the carriage, and means controlled by the alternate movement of said member in opposite directions for alternately starting and stopping said carriage lowering means to automatically lower the cutting stretch of the wire as fast as it removes the material in the cut in the work-piece, said member being an upright swingable hanger for the bearing of the wheel which it carries, said hanger being pivoted at its upper end to the carriage for movement toward and from the other wheel.

4. The combination of claim 3 in which said means normally urging said hanger member in the direction to put said wire under predetermined tension comprises spring means interposed between said hanger and a fixed portion of the carriage and screw means for varying the tension exerted by said spring means.

5. The combination of claim 3 in which said means for suspending and lowering the carriage includes a cable and drum mechanism and worm gearing actuating the latter.

6. The combination of claim 3 in which said means for suspending and lowering the carriage includes a cable and drum mechanism and worm gearing actuating the latter, and in which said means controlled by the alternate movement of the hanger member in opposite directions comprises an intermittent grip mechanism for the step-by-step actuation of said worm gearing, an electric motor for actuating said intermittent grip mechanism, and a switch in the circuit of said motor, said switch being opened and closed by the movement of said hanger in opposite directions.

7. In a machine of the character described, the combination of an upright frame, an elongated carriage vertically movable thereon, cable and drum mechanism for movably suspending said carriage from said frame and including a winding drum at one end of said carriage, worm gearing on the latter for actuating said drum, an intermittent grip mechanism on said carriage for operating said worm gearing, an electric motor on said carriage for actuating said intermittent grip mechanism, a power-driven, endless cutting wire, means mounting said wire on said carriage to dispose the lower stretch of the wire longitudinally of the carriage and substantially horizontal for cutting engagement with a work-piece, said wire mounting means including horizontally spaced wheels between which the cutting stretch of the wire extends, one of said wheels being disposed adjacent one end of the carriage and mounted in bearings fixed to the latter, an upright hanger adjacent the other end of the carriage and pivoted thereto at its upper end, the other of said wheels being mounted in bearings on the lower portion of said hanger, spring means interposed between said hanger and a fixed part of the carriage and acting to swing said hanger in a direction to move said other wheel away from said one wheel to put the wire under predetermined tension and to normally keep said cutting stretch straight, said hanger being moved in the opposite direction by the upward flexing of the cutting stretch of the wire against the work-piece when the carriage is lowered to the extent necessary to put the wire under greater tension than said predetermined tension, a limit switch mounted on said frame and having an operating element movable in one direction to open the switch and in the opposite direction to close it, an electric circuit including said switch and said motor, and a switch actuating member mounted on said hanger and cooperating with the operating element of said switch to alternately open and close said motor circuit as the hanger swings back and forth with the alternate flexing and straightening of the cutting stretch of the wire during the cutting of the work-piece.

8. The combination of claim 7 together with screw means associated with said spring means to vary the tension of the latter, and in which said switch actuating member is a rod mounted for longitudinal adjustment on said hanger.

9. The combination of claim 7 in which the worm of said worm gearing has a shaft which is driven in one direction by said intermittent grip mechanism to cause the lowering of the carriage and in which said intermittent grip mechanism has a driving dog which may be tripped to render said mechanism inoperative, together with a reversible electric motor on said carriage and a belt and pulley drive between said shaft and said reversible motor.

10. In a stone sawing machine having an endless cutting wire supported on a carriage vertically movable on an upright frame, the carriage having a horizontal portion and a depending leg, a pendulum pivoted on said horizontal portion in longitudinally spaced relation to said leg, a wheel on said pendulum about which the cutting wire extends, spring means between said pendulum and said leg for placing the cutting wire under tension, a limit switch on said leg, an actuator on said pendulum for opening and closing said switch as the tension on the cutting wire varies, and means for suspending and lowering said carriage including an electric motor controlled by said switch.

References Cited in the file of this patent

UNITED STATES PATENTS

| Number | Name | Date |
| --- | --- | --- |
| 398,113 | Auguste | Feb. 19, 1887 |
| 451,199 | Kesseler | Apr. 28, 1891 |
| 508,825 | Jeansaume | Nov. 14, 1893 |
| 564,081 | Kelley | July 14, 1896 |
| 594,542 | Knobel | Nov. 30, 1897 |